United States Patent [19]

Frawley

[11] Patent Number: 4,556,084
[45] Date of Patent: Dec. 3, 1985

[54] AIR ADMITTANCE VALVE

[76] Inventor: Adrian J. Frawley, "Timbercroft", Whitepost La., Culverstone, Near Meopham, Kent, England

[21] Appl. No.: 698,260

[22] Filed: Feb. 5, 1985

Related U.S. Application Data

[63] Continuation of Ser. No. 518,559, Jul. 29, 1983, abandoned.

[30] Foreign Application Priority Data

Jul. 29, 1982 [GB] United Kingdom ............... 8221946

[51] Int. Cl.[4] ............................................. F16K 15/02
[52] U.S. Cl. ................................. 137/526; 137/533.27
[58] Field of Search ............... 137/217, 218, 479, 480, 137/493.7, 493.8, 493.9, 526, 533.27

[56] References Cited

U.S. PATENT DOCUMENTS

| | | | |
|---|---|---|---|
| 1,628,069 | 5/1927 | Schmidt | 137/526 X |
| 1,819,827 | 8/1931 | Thwaits | 137/526 |
| 2,302,284 | 11/1942 | Abbott | 137/526 |
| 2,928,413 | 3/1960 | Hansen | 137/526 X |
| 3,605,132 | 9/1971 | Lineback | 137/526 X |
| 4,091,837 | 5/1978 | Edmunds | 137/493.7 X |
| 4,398,557 | 8/1983 | Dugge | 137/493.9 |

FOREIGN PATENT DOCUMENTS

| | | | |
|---|---|---|---|
| 969650 | 6/1958 | Fed. Rep. of Germany | 137/526 |
| 2534175 | 2/1977 | Fed. Rep. of Germany | 137/217 |
| 1152297 | 2/1958 | France | 137/217 |
| 94714 | 9/1959 | Norway | 137/493.9 |

Primary Examiner—Robert G. Nilson

[57] ABSTRACT

An air admittance valve, particularly for use on a stack pipe of a toilet or drainage system, to close the pipe when there is at least atmospheric pressure in the pipe, but to open to admit atmospheric air to the pipe upon the occurrence of even a very small less-than-atmospheric pressure in the stack pipe. The valve has a hollow body (1,2) with a lower opening to the stack pipe, and an internal wall defining a chamber and a valve seat about an upward opening, and a lateral opening to the exterior. A valve member (3) in the body above the chamber opens and closes the upward opening, and the valve member is guided in alignment with the valve seat.

4 Claims, 5 Drawing Figures

AIR ADMITTANCE VALVE

This application is a continuation of application Ser. No. 518,559, filed July 29, 1983, now abandoned.

This invention relates to valves used for the control of air flow in upwardly opening vertical pipes, and is particularly but not exclusively applicable to the control of air flow in stack pipes forming part of household toilet and drainage systems.

It is the object of the present invention to provide an air admittance valve of improved construction which can be fitted to the normally open upper end of a stack pipe and which is so arranged as to normally close the end of the stack pipe under conditions of atmospheric or greater-than-atmospheric pressure in the stack pipe, but to open to admit atmospheric air upon the occurrence of even a very small less-than-atmospheric pressure in the stack pipe.

According to the present invention, an air admittance valve comprises a hollow body having, when in use, a lower opening for communication with the upper end of a pipe, said body having internal walling defining therein a chamber and a valve seat about a first opening which is directed upwardly in the body and a second opening which is directed laterally of the body to the exterior, a valve member disposed in the hollow body above said chamber and movable up and down with respect to said valve seat to open and close said first opening of the chamber, and means to guide said valve member in alignment with said valve seat.

Preferably the valve member is of relatively large area and light weight, so as to be readily operable, against gravity, by even small amounts of negative pressure occurring in the stack pipe. By way of example, where the body is of circular section, the valve member has a diameter which is at least half of the diameter of the body.

To enhance the air-tight sealing engagement of the valve member with the valve seat, it may have secured at its underside a flexible and resilient sealing diaphragm, and in a preferred form this is a thin disc or annulus of rubber or like flexible material.

In an advantageous construction, the guide means to act between the internal walling and the valve member comprise a guide pin extending upwardly from a transverse portion of the internal walling, and a hollow stem on the valve member slidable up and down substantially without friction on said pin. Where a sealing diaphragm is provided, such diaphragm may be secured to the under side of the valve member by a circular spring clip or equivalent means engaged on the stem and abutting the underside of the diaphragm.

In a preferred embodiment of the valve, the body comprises a lower portion having the internal walling, and a cap and cover portion which is removably engaged in air-tight manner on the lower portion. By way of example, the lower portion of the body may have an open upper end which is externally threaded, and the cap and cover portion is correspondingly internally threaded below a plane top wall and within the upper end of a preferably inclined, e.g. frusto-conical, outer skirt portion spaced from the lower portion. Preferably such skirt portion extends to somewhat below the level of the second opening of the inner chamber. Preferably also, a seal may be provided between the lower part of the body and the cap and cover portion, e.g. a rubber or like ring engaged in a circular recess in the upper end of the lower part of the body and positioned to be compressed between the body and the cap and cover portion when the latter is threaded fully home on the body.

Advantageously the entire valve, other than the sealing diaphragm and the sealing ring and the metal clip, is made of injection moulded plastics material, e.g.(i) a lower part for the body including the internal walling and the chamber, (ii) a valve plunger including the valve member and the hollow stem therefor, and (iii) a cap and cover portion.

The dimensions of the various parts of the valve are advantageously so arranged that, when the cap and cover portion has been fully tightened into position, it is spaced vertically from the valve seat of the first opening of the inner chamber to such an extent that it permits the valve member to rise and fall as necessary, but limits the rise of the valve member to prevent the latter becoming entirely disengaged from its guiding means.

An embodiment of air admittance valve in accordance with the invention is hereinafter particularly described with reference to the accompanying drawings, wherein.

Figure 1:
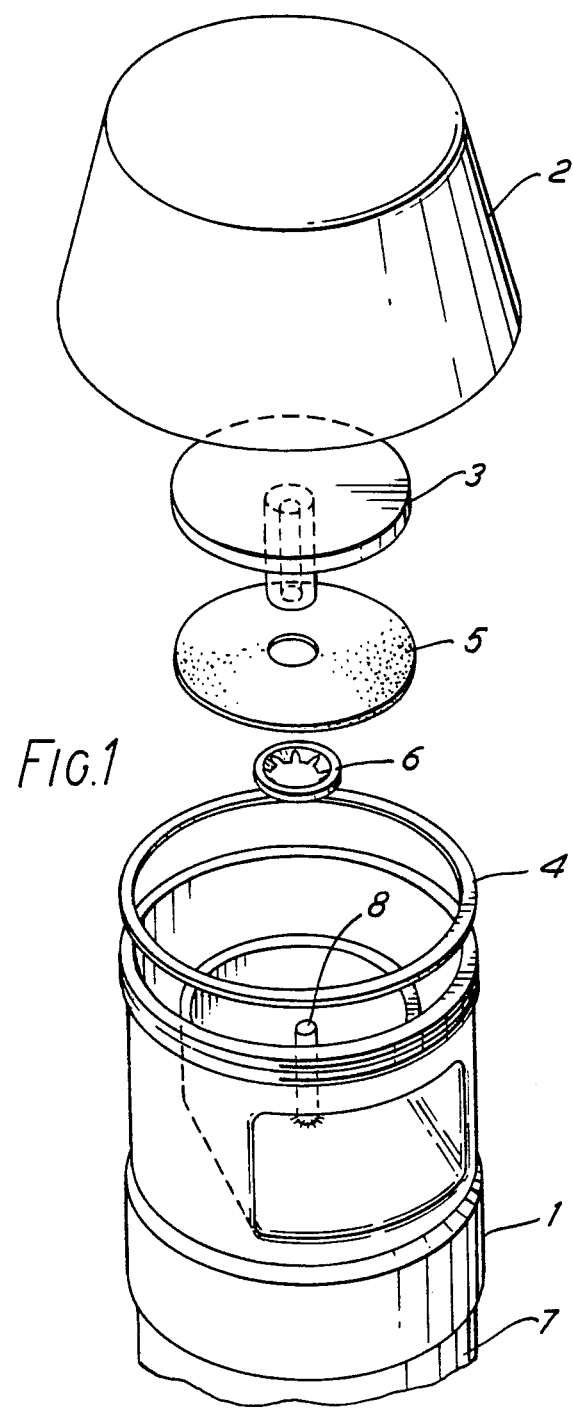
FIG. 1 is a perspective elevation, with the parts shown in axially separated condition, of the valve.
Figure 2:
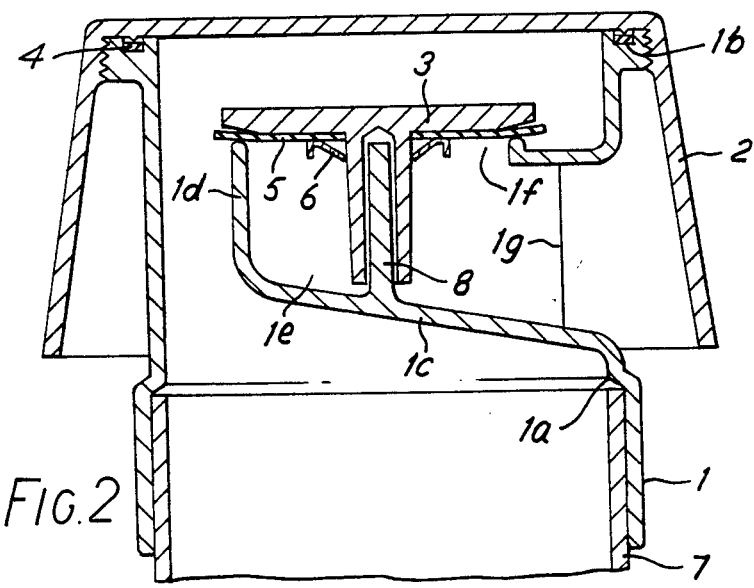
FIG. 2 is an axial section of the valve, seen engaged on a stack pipe.
Figure 3:
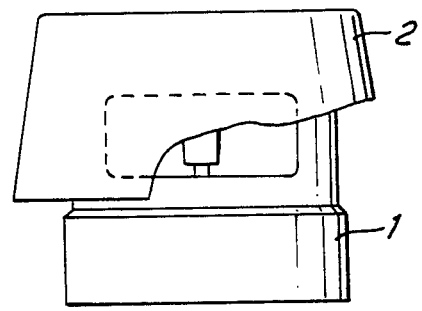
FIG. 3 is a side elevation of the valve, with part shown broken away to reveal internal details.

Referring to FIG. 1, the valve comprises a main body 1 which is of greater internal and external diameter at its lower part so as to permit engagement over the open upper end of a stack pipe 7, and presents a shoulder 1a which limits engagement onto the stack pipe 7.

At its upper end the body 1 is externally screw threaded to receive an internal screw threading at the upper interior of a retaining cap and cover 2. Internally of its screw threading the upper end of the body 1 is recessed circumferentially and axially to provide a seating 1b for a resiliently compressible sealing ring 4 which can become tightened between the cap 2 and the body 1 when the cap has been fully tightened onto the body, and thereby forms an air-tight seal between the cap and the body.

Internally, the body 1 is formed with a partial transverse wall which firstly passes across at a slight upward inclination 1c to the horizontal and then extends upwardly by a part-cylindrical portion 1d so as to bound a central chamber 1e which opens upwardly to the top part of the body 1 through a circular opening 1f, and which also opens laterally of the body 1 to the exterior, at 1g.

On the inclined portion 1c of the transverse wall there is provided a fixed guide pin 8 which is coaxial with the circular opening. On the guide pin 8 there is engaged, as a loose sliding fit, the hollow stem of a valve plunger 3 which overlies the circular opening. To provide an air-tight seal between the plunger 3 and the circular opening, the plunger 3 is provided at its underside with a flexible and resilient diaphragm 5 which is retained on the hollow stem by means of a resilient star locking washer 6 forced onto the stem.

Figure 4:
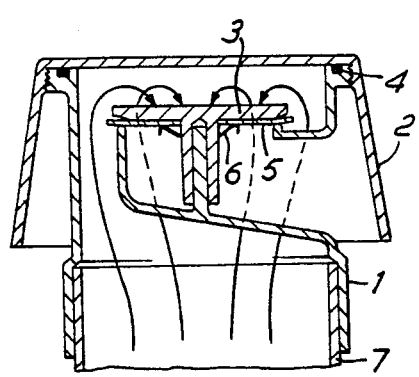
FIG. 4 is an axial section, to a smaller scale, to show the effect of air pressure on the valve, under conditions of normal or positive pressure in the stack pipe.
Figure 5:
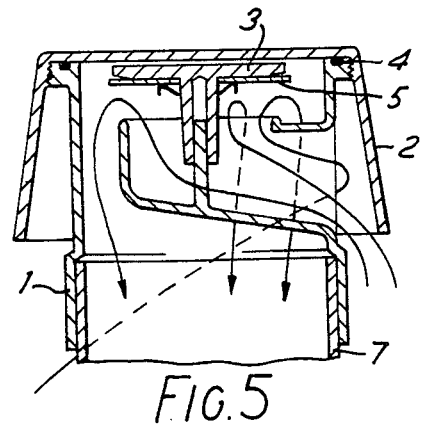
FIG. 5 is an axial section, to a smaller scale, to show air flow through the valve under conditions of negative pressure in the stack pipe.

Referring to FIGS. 4 and 5, and assuming that the valve has been positioned on the open upper end of a stack pipe, the normal condition of the stack pipe is that its internal pressure will remain at atmospheric, or may be slightly positive, i.e. greater than atmospheric. The pressure in the stack pipe is present also in the upper part of the valve body 1 and will be applied against the upper face of the valve plunger 3. The underside of the valve plunger 3 is exposed to atmospheric pressure through the lateral opening. Accordingly, there is a differential of pressure tending to force the plunger 3 onto its seating, and thereby seal the stack pipe against outflow of air or gas.

Referring now to FIG. 5, upon the occurrence of a negative, i.e. less than atmospheric, pressure in the stack pipe, the upper surface of the plunger 3 is subjected to less than atmospheric pressure, whilst its underside is subjected to atmospheric pressure. Accordingly there is now a pressure differential tending to lift the plunger 3 off its valve seating, and the valve opens to admit air from the exterior. Air enters the valve through the lateral opening, as shown by the arrows in FIG. 5, and passes into the upper part of the body 1 and then into the stack pipe.

I claim:

1. A valve, for admittance of atmospheric air into an upper end of a pipe when external air pressure exceeds pressure within the pipe, comprising:
   (i) a tubular body having a side wall defining an upper end opening and a lower end opening,
   (ii) an internal wall positioned in said body intermediate its upper and lower end openings, said internal wall including a first portion which extends from the side wall of the body partly across the interior of the body and a second integral wrapper portion which is coextensive with the first portion and together therewith defines within the body an internal chamber which has only a first opening directed towards the upper end opening of the body and a second and lateral opening provided in the side wall of the body,
   (iii) a valve member including a valve element to seat removably on said wrapper portion to open and close said first opening of the internal chamber such that when said valve is in its closing position said first and second internal wall portions and said valve element collectively close off said internal chamber from the remainder of the interior of the body,
   (iv) a guide element on said first internal wall portion extending centrally towards the first opening of the internal chamber,
   (v) a hollow depending stem on said valve element to engage over and slide on said guide element for guiding said valve element during lifting and lowering of the valve member relative to said wrapper portion, and
   (vi) a cap and cover removably engaged in airtight manner on an upper portion of said body and including a portion bounding said upper end opening thereof and spaced above said valve element.

2. A valve, as claimed in claim 1, wherein said tubular body is of circular section, and wherein said valve element and said first opening of the internal chamber have a diameter which is at least half the diameter of the body.

3. A valve, as claimed in claim 1, wherein said cap and cover portion is a plane top wall closing said upper end opening of the body, and said cap and cover includes a skirt depending from said plane top wall and spaced externally from the side wall of the body.

4. A valve, as claimed in claim 1, wherein said cap and cover is engaged by screw-threading on said upper portion of said body.

* * * * *